United States Patent [19]

Taylor et al.

[11] Patent Number: 5,463,732

[45] Date of Patent: Oct. 31, 1995

[54] METHOD AND APPARATUS FOR ACCESSING A DISTRIBUTED DATA BUFFER

[75] Inventors: Herbert H. Taylor, Pennington; James T. C. Kaba, Jackson, both of N.J.

[73] Assignee: David Sarnoff Research Center, Inc., Princeton, N.J.

[21] Appl. No.: 242,397

[22] Filed: May 13, 1994

[51] Int. Cl.$^6$ ..................................................... G06F 15/16
[52] U.S. Cl. ............................................................ 395/163
[58] Field of Search ..................................... 395/162, 163, 395/164, 165, 250, 275, 375, 425, 800; 364/131, 133, 228.4, 230.2, 231.9, 238.6, 238.7, 239.7, 244.8, 245.7

[56] References Cited

U.S. PATENT DOCUMENTS

| | | | |
|---|---|---|---|
| 4,344,134 | 8/1982 | Barnes | 395/800 |
| 4,414,624 | 11/1983 | Summer | 395/650 |
| 4,786,820 | 11/1988 | Ogiro et al. | 358/482 |
| 4,965,718 | 10/1990 | George | 395/425 |
| 5,038,282 | 8/1991 | Gilbert et al. | 395/200 |
| 5,129,077 | 7/1992 | Hillis | 395/500 |
| 5,175,865 | 12/1992 | Hillis | 395/800 |
| 5,325,493 | 6/1994 | Herrell et al. | 395/375 |
| 5,390,336 | 2/1995 | Hillis | 395/800 |

OTHER PUBLICATIONS

Gschwird, H. W., McCluskey, E. J. "Design of Digital Computers" Springer–Verlag, New York 1975 pp. 338–339.

Primary Examiner—Raymond J. Bayerl
Assistant Examiner—U. Chauhan
Attorney, Agent, or Firm—William J. Burke

[57] ABSTRACT

In a parallel processing computer containing a plurality of processors, each connected to a memory unit, a method and apparatus for accessing a distributed data buffer. Each of the processors within the computer executes a first routine for processing input data to generate output data. During processing, some or all of the data associated with the processing is temporarily stored within a predefined portion of each of the memory units that form a portion of the distributed data buffer. Upon occurrence of an interrupt signal, execution of the first routine is halted. Also, the status of the computer at the time the interrupt signal occurred is stored in memory. Thereafter, a second routine (an interrupt routine) is executed to access the data stored in the data buffer. Once the data is accessed, the status of the computer is restored in accordance with the previously stored computer status information. Lastly, the first routine is restarted at a position therein at which the first routine was interrupted to execute the second routine.

14 Claims, 4 Drawing Sheets

METHOD AND APPARATUS FOR ACCESSING A DISTRIBUTED DATA BUFFER

The invention relates to parallel processing computer systems and, more particularly, the invention relates to a method and apparatus for accessing a distributed data buffer within a parallel processing computer.

BACKGROUND OF THE DISCLOSURE

Generally, parallel processing computers are used in high-speed data processing applications wherein multiple data streams are individually processed by separate processors. Since each processor executes the same instruction upon different data, such a parallel processing computer is known as having a single instruction, multiple data stream (SIMD) architecture.

One illustrative application of a SIMD computer system is a system for displaying video signals in "real-time" upon a video monitor. Specifically, such s a system contains a plurality of processors, local memory connected to each processor, and input/output circuitry interconnecting the processors. Also, the data (digital video information) entering the processors is buffered (input buffering) and the data exiting the processors is buffered (output buffering). Such buffering ensures that the processing rate of the processors is compatible with the input and output data rates. The data buffering is typically accomplished by temporarily storing the input and output data in the local memory associated with each processor.

Each processor within a real-time video signal processing system is typically assigned the task of generating a pixel value within each line (scanline) of a video display. Therefore, the number of parallel processors is equivalent to the number of pixels in a line of video information. Typically, each line of a video display is generated at approximately a 15 kHz rate. Thus, each processor must generate a pixel value at approximately a 15 kHz rate. As such, the plurality of parallel processors simultaneously produce all the pixels in one scanline. For example, if there are 512 pixels contained in a line, then 512 parallel processors are used. Each line of pixel values is temporarily stored (buffered) in a frame buffer until an entire frame of pixels is accumulated, e.g., 525 lines represents one frame. More specifically, each processor stores its computed pixel values in its local memory. Cumulatively, all the memory locations taken together form a distributed frame buffer. Once a frame of data has been accumulated in the distributed buffer, the frame of pixel data is sent to output circuitry that formats the data in a manner that can be utilized by a video display monitor.

To reiterate, the frame buffer is typically distributed across the local memory, i.e., the pixel values produced by a given processor are stored in local memory associated with that processor. Similarly, if the input data needs buffering before the processor can use it, the input data is distributed amongst the processors and also buffered in the local memory. Thus, an input serial data stream is processed to distribute the stream amongst the distributed input data buffers, i.e., within specific, pre-defined memory locations in the local memory associated with each processor. Furthermore, to facilitate data display, the output data that is distributed amongst the processor local memories is reorganized into a serial output data stream.

In operation, input data (pixel values) is supplied from an input device, e.g., a digital video camera, and that data is distributed amongst the processor local memories (distributed input buffering). In response to SIMD instructions contained in a program executed by each of the processors, each processor performs a specified computation upon the input data stored in each processor's local memory. For example, in an image processing context, such processing may include filtering, image rotation and scaling, image projections on a viewing plane, and the like. The result of the computation (a pixel value to be displayed) is buffered in the processor's associated local memory (output buffering) until an entire frame of pixel values has been computed and stored. Thereafter, the frame of pixel values is serially transferred, via computer system input/output circuitry, to an output circuit. The output circuit appropriately formats the output data for use by the video display device.

To achieve "real-time" processing, the system must compute the pixel values at approximately 15 kHz and produce each video frame at a rate of 30 flames per second. Thus, given a processor clock speed and assuming that the processor executes one instruction per clock cycle, a maximum number of instructions per pixel computation can be calculated. For example, if the processor clock speed is 14.316 MHz and the line rate is 15.7343 kHz, then 14.316 MHz/ 15.7343 kHz results in an instruction budget of approximately 910 instructions per pixel computation. Thus, for a given clock speed, there is a maximum number of instructions that can be executed to maintain real-time processing. If more instructions than are budgeted are necessary to produce a pixel, then the processors cannot update the display in real-time.

More specifically, the following pseudo-code represents the foregoing process for generating a display as accomplished in the prior art.

```
Program
{
COMTIME routine
{
Get input data from input circuitry
Write output data to output circuitry
}
Execute MAIN routine to produce output data
RESTART routine
{
Execute NOPs until a horizontal sync pulse occurs,
then
restart this program
}
}
```

The foregoing pseudo-code is executed by each processor after each horizontal synchronization pulse occurs. As is well-known in the art of video signal display technology, the horizontal synchronization pulse represents when new line of pixel information needs to be generated for use by the display. Thus, upon occurrence of the horizontal sync pulse, the program first executes the COMTIME routine. This code retrieves data from the input circuitry and places that data into local memory (distributed input buffer) and also transfers output data from the local memory (distributed output buffer) to the output circuitry. This output data was generated upon the previous pass through the MAIN routine portion of the program. Once the COMTIME routine is complete, each processor executes a series of instructions comprising the MAIN routine. To process and display the data in real-time, the number of instructions in the MAIN routine must be less than the instruction budget. The MAIN routine, executing on each processor, uses the input data in the input buffer to compute output data (a pixel value). The output data is temporarily stored in the output buffer. Cumulatively, all of the data generated by the processors after a single pass through the MAIN routine forms a single scanline of video display information.

Once the MAIN routine computes the output data, the routine executes the RESTART routine which causes the processor to execute no-operations (NOPs) until the next horizontal synchronization pulse occurs. Generally, NOPs are used to fill processing time that is not used because a given processor has completed its processing within the instruction budget.

When the horizontal sync pulse occurs, the program counter for all the processors is reset to the beginning of the program and the program is executed again to produce the next scanline of pixel values. By repetitively executing the program a frame of pixels is generated and stored, one scanline at a time, in the distributed output buffer. Using the COMTIME routine, the entire frame, once generated, is transferred, one scanline at a time, from the output buffer for display. As such, the display is updated in real-time, i.e., the display is refreshed with new data at a 30 frame per second rate.

For computer systems that cannot generate a pixel value within the instruction budget, the display is refreshed using old data (previously computed data) until a frame of new data is computed. In such systems, frame buffering is used to store one or more flames of output data. The present frame being displayed is repetitively displayed until the computer system produces a frame of new data. Then, the new data is repetitively displayed until the computer system produces the next frame of data, and so on. As such, a new frame of data is not available at the standard frame rate of the display device, e.g., 30 frames per second. To implement this method, a special monitoring routine is added to the pseudo-code above to monitor when the system has generated each complete frame of data. This routine then informs the output circuitry of the availability of the new frame of data. Such a routine consumes processing cycles that could better be used for data processing.

Detrimentally the present methods of accessing distributed frame buffers in parallel processing computers must be either accomplished within a strict instruction budget or must include a routine for monitoring frame readiness.

Therefore, a need exists in the art for a method and apparatus for accessing a distributed data buffer in a parallel processing computer that does not impact the nature and function of a MAIN routine that accomplishes data processing.

SUMMARY OF THE INVENTION

The present invention overcomes the disadvantages heretofore associated with prior art by providing a technique for accessing a distributed data buffer that does not impact the nature of a data processing routine with which the inventive technique operates. Generally, the invention is a method and apparatus residing within a parallel processing computer containing a plurality of processors, each connected to a memory unit and computer system input/output circuitry. The inventive technique uses an interrupt routine to temporarily halt execution of a MAIN data processing routine and, thereafter, access a distributed data buffer (either an input data buffer, an output data buffer, or both). Specifically, each of the processors within the computer executes a first routine (MAIN processing routine) for processing input data to generate output data. During processing, some or all of the data associated with the processing is temporarily stored within the data buffer (a predefined portion of each of the memory units). Upon occurrence of an interrupt signal, execution of the first routine is halted. Also, the status of the computer at the time the interrupt signal occurred is stored in memory. Thereafter, a second routine (an interrupt routine) is executed to access the data stored in the distributed buffer. Once the data is accessed, the status of the processors is restored in accordance with the previously stored status information. Lastly, the first routine is restarted at a position therein at which the first routine was interrupted to execute the second routine. Since access to the distributed data buffer is entirely accomplished by an interrupt routine, the first routine can be of any form without regard for data buffer accessing functions.

BRIEF DESCRIPTION OF THE DRAWINGS

To facilitate understanding, identical reference numerals have been used, where possible, to designate identical elements that are common to the figures.

DETAILED DESCRIPTION

Figure 1:
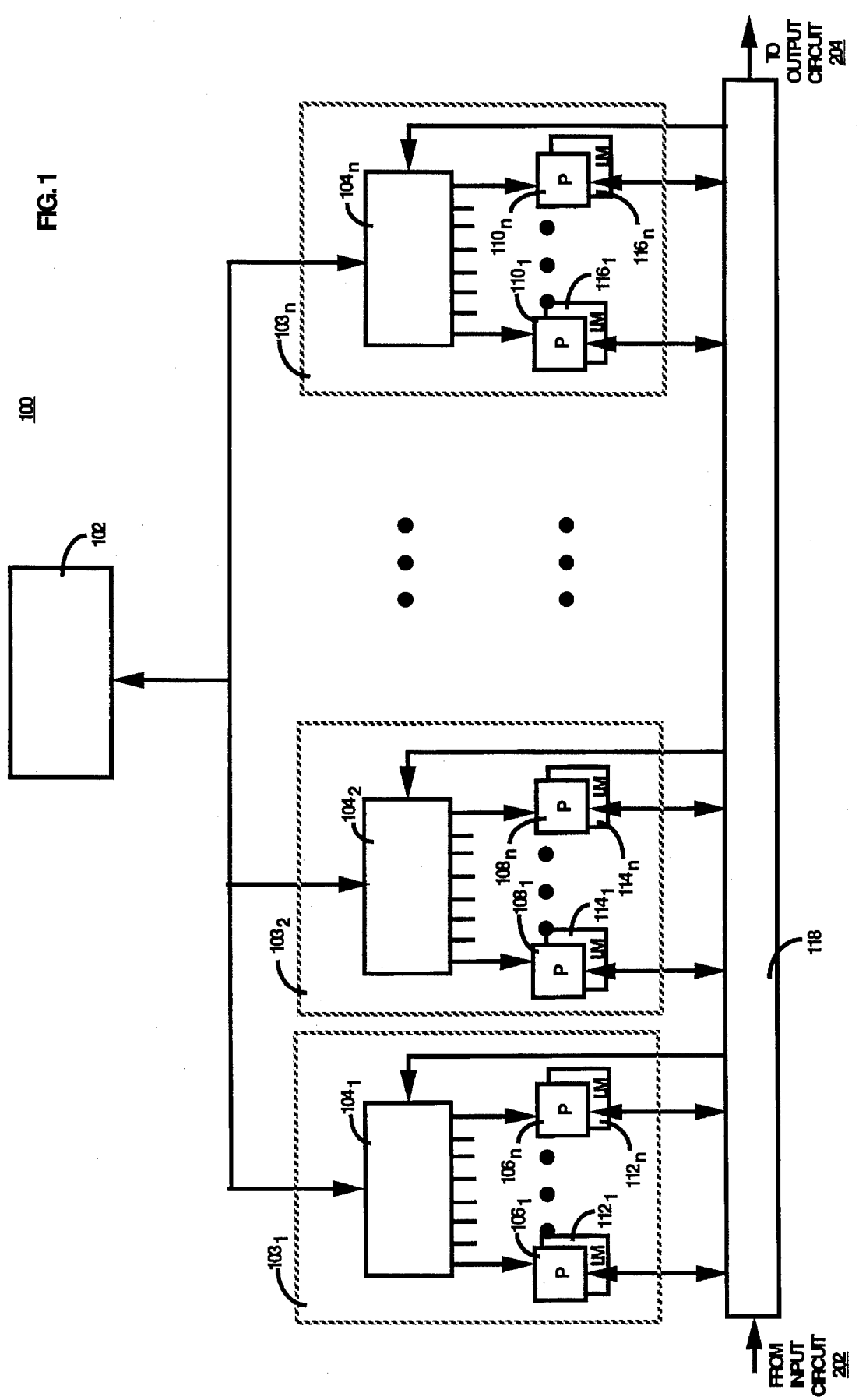
FIG. 1 depicts a high level block diagram of a parallel processing computer system that utilizes the present invention.

FIG. 1 depicts a high level block diagram of a parallel processing computer system 100. The computer system 100 contains a host computer 102, a plurality of controllers $104_n$, and, associated with each controller, a plurality of processor subsystems $106_n$, $108_n$ and $110_n$ and a plurality of local memory units $112_n$, $114_n$, $116_n$. Additionally, each of the processors is connected to computer system input/output (I/O) circuitry 118 such that different data can be sent to each processor and the data computed by each of the processors is organized as a single stream of output data.

Specifically, a parallel processing computer having a substantially similar configuration as the computer system shown in FIG. 1, known as the Sarnoff Engine, has been designed by the David Sarnoff Research Center of Princeton, N.J. The Sarnoff Engine is disclosed in a U.S. patent application entitled "Advanced Massively-Parallel Computer Apparatus" assigned Ser. No. 08/091,935, filed Jul. 12, 1993, which is a continuation-in-part patent application, Ser. No. 07/926,265, filed Aug. 5, 1992. These applications are incorporated herein by reference.

The host computer 102 generally serves as an interface between the processor subsystems and the programmer or computer user. Additionally, the host computer functions as a main controller that monitors and controls the operation of the various controllers and processor subsystems within the parallel processing computer.

Each processor subsystem contains a processor, an arithmetic logic unit and conventional processor support circuitry. All of which is well-known in the art and, therefore, not shown in detail. Each processor subsystem is associated with a local memory unit $112_n$, $114_n$, $116_n$. The memory units are typically semiconductor memory located on the integrated circuit with its associated processor. These memory units form distributed input and output data buffers for each of the processors. The details of these buffers are discussed below.

The data (both input and output) is communicated between the buffers and the output and input circuits via computer system input/output (I/O) circuitry 118.

Figure 2:
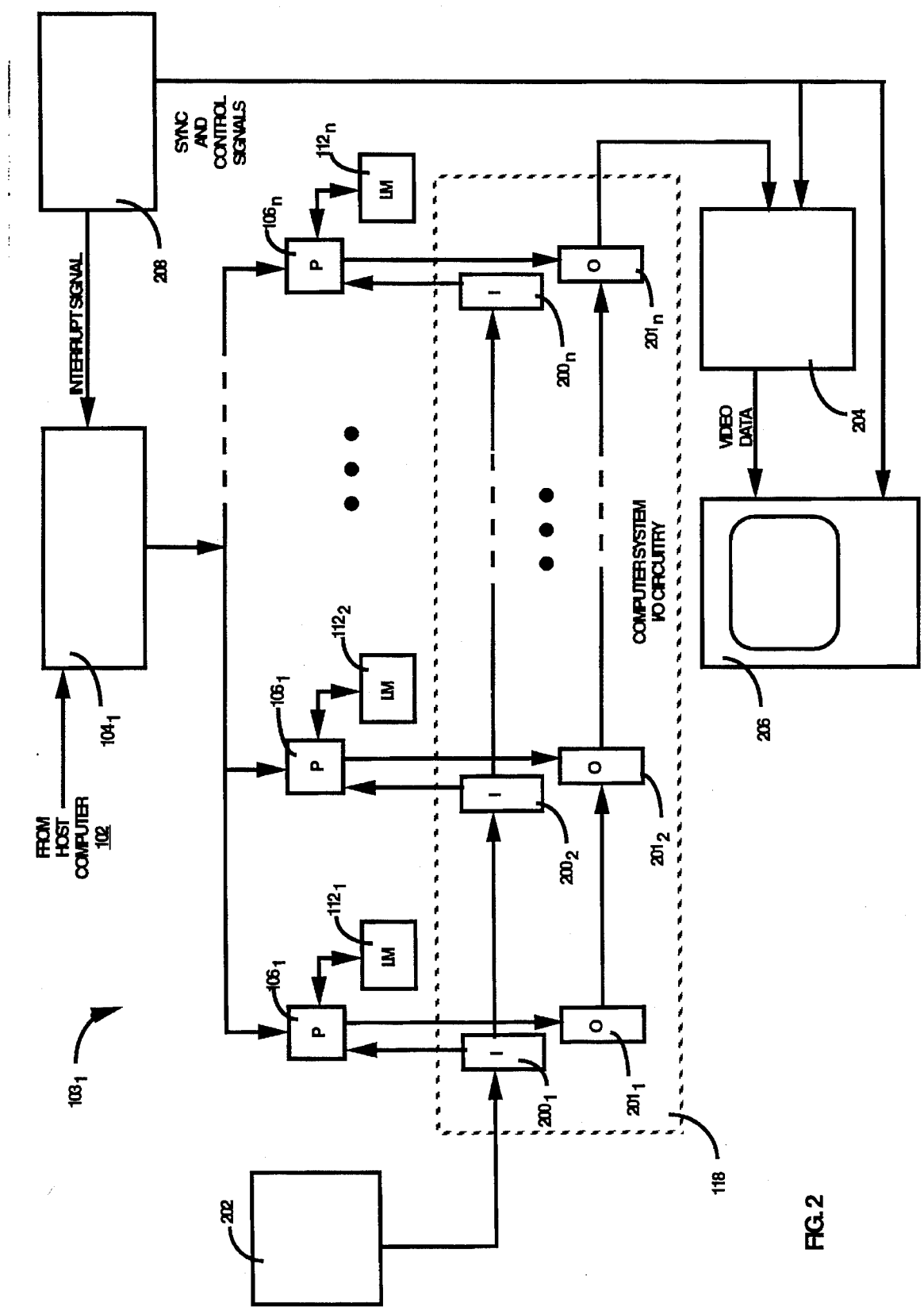
FIG. 2 depicts a block diagram of a particular portion of the computer system shown in FIG. 1.

More specifically, FIG. 2 depicts a block diagram of a portion $103_1$ of the computer system shown in FIG. 1. Illustratively, the following discussion assumes that the computer system 100 is being used to process video data from a digital video signal source (input circuit 202), such as a digital video camera. Furthermore, it is assumed that the computer system processes the input data into output data that is used by output circuit 204 to form a video display of the data upon a conventional video monitor 206. However, those skilled in the art will realize from the following discussion that the invention may be used in conjunction with any form of distributed data buffer storing any type of data.

Specifically, the digital video signal (a serial data stream) is distributed amongst the processors subsystems by computer system I/O circuitry 118. In particular, the input circuits of circuitry 118 are formed by a cascade arrangement of shift registers $200_1$, $200_2$, and $200_n$. As such, a single scanline of video data is distributed across n registers, each capable of storing a single pixel value, i.e., one pixel value of data per processor. This data may not be processed by each processor right away. Therefore, the serial data is temporarily stored (buffered) in the local memory $112_1$, $112_2$, and $112_n$ until used by the associated processor subsystem $106_1$, $106_2$ and $106_n$. Thus, at any instant of time, the distributed input data buffer may store a number of scanlines of data. The buffering may take any form; however, typically, each pixel in a scanline of video data from a video source (input circuit) is stored in a single local memory unit. Thus, each shift register $200_n$ and each memory unit receives one pixel value from each scanline and the number of processor subsystems is equivalent to the number of pixels in a scanline of video pixels, e.g., n equals 512. The "depth" of the distributed input buffer, i.e., the number of scanlines stored therein at any instant of time, depends upon the system processing rate as compared to the input data rate. In other words, the input buffer depth is application specific. When necessary, each scanline of input data is retrieved from the input buffer and processed by the processors to compute a scanline of output pixel values. Once computed by the processors, the newly formed pixel values are again temporarily buffered in local memory $112_1$, $112_2$, and $112_n$ until transferred, via the computer system I/O circuitry 118, to the output circuit 204. Generally, at least one entire frame of pixel values is buffered. As with the input buffer, the particular depth of the output buffer is application specific. Periodically, at a rate required by the output circuit and the video monitor, a scanline of pixel values is transferred from the output buffer into the output registers $201_n$, i.e., one pixel value from each local memory is transferred to an output register associated with that local memory. For example, a pixel value for pixel 0 in scanline 1 is stored in local memory $112_1$. When scanline 1 is to be generated on the video monitor 206, pixel 0 is transferred from local memory $112_1$ into output register $201_1$. Similarly and simultaneously, pixel 1 in scanline 1 is transferred from local memory $112_2$ into register $201_2$ and so on until n pixel values for scanline 1 are stored in n output registers. Thereafter, the registers are emptied into the output circuit 204 such that the data is used to produce scanline 1 on the screen of video monitor 206. By repeating this retrieval process, a complete frame of video data is displayed. Typically, the output buffer is subdivided into two buffers such that one buffer is being emptied of a frame of data while the other buffer is being filled with new data. Once a buffer becomes full and the other buffer empty, the two buffers are swapped and the buffer filling/emptying process is repeated.

The output circuit 204 formats the serial output data from the parallel processing computer system in a form that can be used and displayed on the video monitor 206. To facilitate appropriate data formatting, a video system timing circuit 208 generates synchronization and control signals, e.g., vertical and horizontal sync pulses, for both the output circuit 204 and the video display monitor 206. Additionally, circuit 208 produces an interrupt signal that is used by the controller to control access to the distributed buffers and buffer swapping. This interrupt signal is typically, but not always, synchronized with the horizontal sync pulse. The specific process used to access the distributed data buffers is described below.

Figure 3:
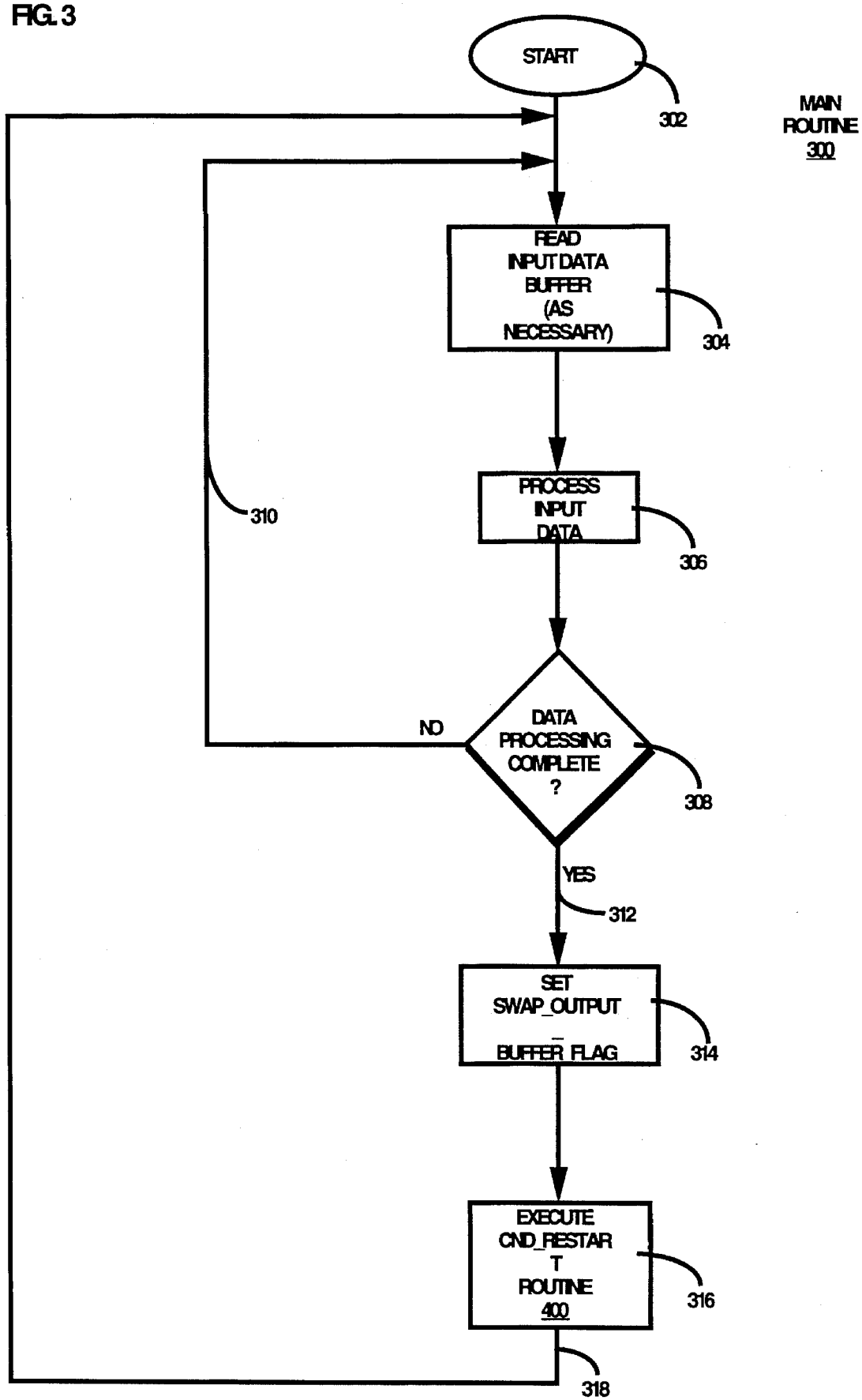
FIG. 3 depicts a flow chart of a MAIN routine that is executed by each processor in the computer system shown in FIG. 1.

As shown in FIG. 3, the input data is processed in each processor by a MAIN routine 300, i.e., each processor executes the same routine upon different input data located in its associated input buffer. The MAIN routine is entered at step 302. At step 304, the MAIN routine retrieves input data, as necessary, from the input data buffer (a designated portion of local memory). At step 306, the input data is processed one scanline at a time to generate a frame of pixel value data. As the processors generate output data, the new frame of data is stored in a portion of a distributed output buffer, e.g., a first output buffer. In the video processing context, this processing may, for example, change the input pixel color, move the pixel in space, combine the input pixel value with a scalar quantity, combine the input pixel value with another pixel value, or perform some other well-known image processing function. The details of the processing accomplished by the MAIN routine are unnecessary to understanding the invention. In fact, since the inventive input and output data buffer accessing process (CND_COMTIME routine explained in connection with FIG. 5) is executed upon an interrupt signal, the MAIN routine can have any form, i.e., the MAIN routine can even contain more instructions than a conventional instruction budget requires for real-time processing.

At step 308, the MAIN routine 300 queries whether processing is complete, e.g., a frame of output pixel values have been generated and stored in the first distributed output buffer. If processing is not complete, the routine continues along NO path 310 to continue processing additional input data. If processing is complete, the routine continues along YES path 312 to step 314. When data processing is complete, the output data, e.g., a frame of pixel values, is stored in the first distributed output buffer (a designated portion of local memory). Typically, as previously mentioned, there are two distributed output buffers. As one buffer is being filled with data, the other is being emptied. As such, when a buffer is filled a flag must be set to indicate that the buffer is ready to be emptied. At step 314, a SWAP_OUTPUT_BUFFER_FLAG is set which indicates that a buffer, e.g., the first output buffer, is full and that a so-called "buffer swap" must be accomplished. By setting this flag, the processor indicates that the output data is ready to be exported to the output circuitry and any new output data generated should be stored in the second output buffer, i.e., stored in a new portion of the local memory. This illustrative MAIN routine interacts with two output buffers; however, those skilled in the art will realize that any number of output buffers could be used. At step 316, the MAIN routine executes a CND_RESTART routine 400 (see FIG. 4 and the description below). Once the CND_RESTART routine is complete, the MAIN routine continues along path 318 to process more input data, e.g., produce pixel values for the next frame of video.

Figure 4:
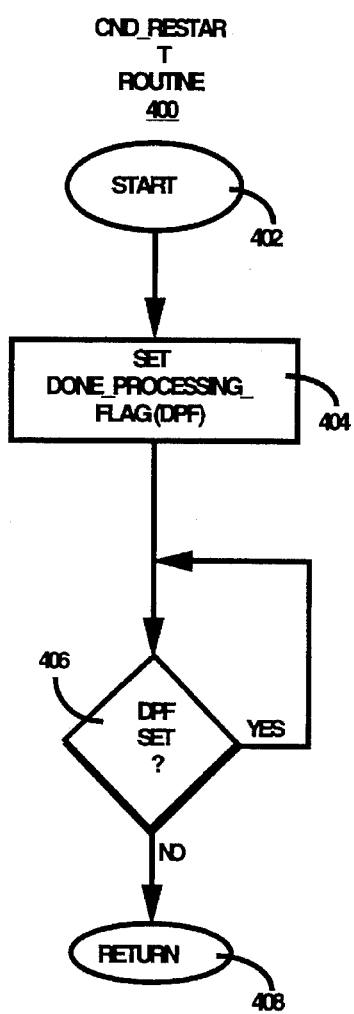
FIG. 4 depicts a flow chart of a CND_RESTART routine that is executed by each processor in the computer system shown in FIG. 1.
Figure 5:
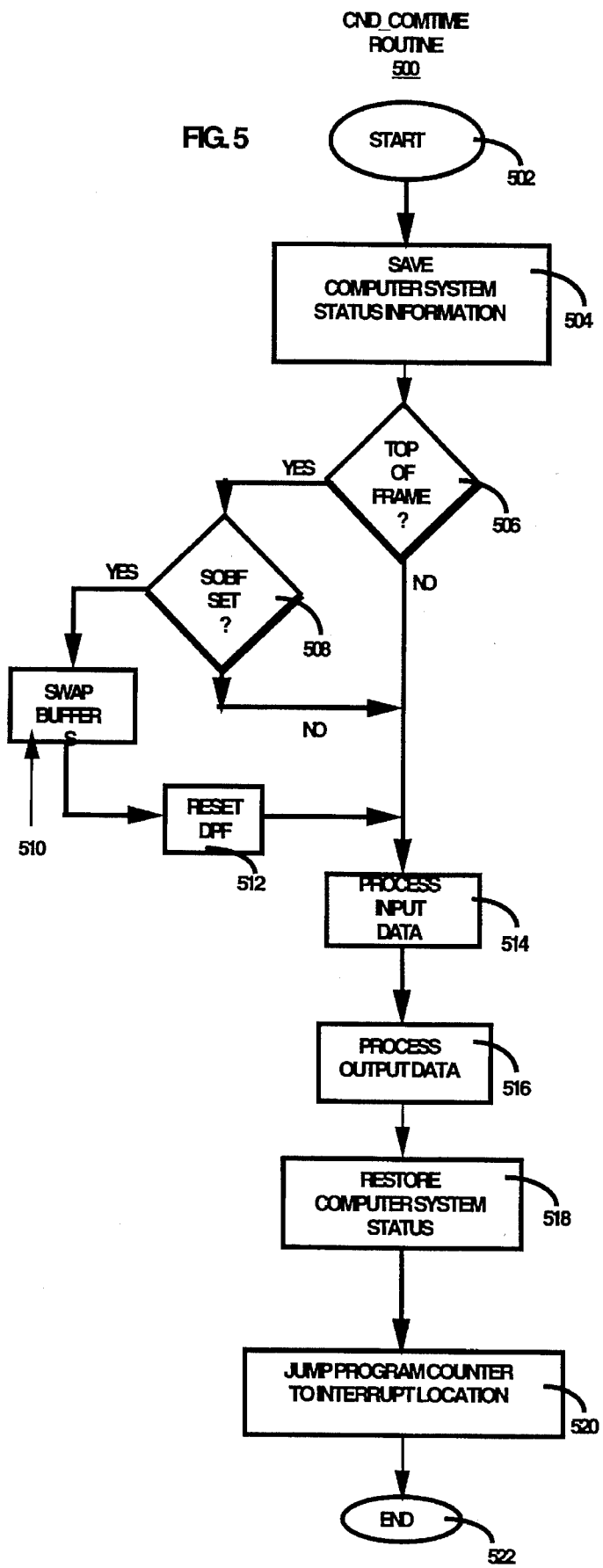
FIG. 5 depicts a flow chart of a CND_COMTIME routine that is executed by each processor in the computer system shown in FIG. 1.

FIG. 4 depicts a flow chart of the CND_RESTART routine 400. This routine is called from step 316 of the MAIN routine 300 and is entered at step 402. At step 404, the DONE_PROCESSING_FLAG (DPF) is set to indicate that a frame of data is stored in the output buffer (first) and, as such, the processor is finished processing data. At step 406, the processor is placed in a "hold" mode where no operations (NOPs) are executed until the DPF is reset by the CND_COMTIME routine 500 (FIG. 5). Thus, the CND_RESTART routine loops along the YES path until the query in step 406 is negatively answered. Once the query is negatively answered, the CND_RESTART routine returns to step 316 in the MAIN routine. Consequently, after the MAIN routine computes a frame of pixel values, the CND_RESTART routine is intended to hold the processor in a wait state until the CND_COMTIME routine 500 resets the DPF. The DPF reset occurs upon occurrence of a specific interrupt signal that is typically synchronized with the horizontal synchronization signal used by the video monitor to produce a display. Thus, all the processors restart at occurrence of the sync pulse. However, the processors do not have to complete their processing before occurrence of a given sync pulse, e.g., at a 15 kHz rate. If the MAIN routine runs longer than the period of time between sync pulses, the routine is merely reset at the sync pulse that occurs after processing is complete. As such, the MAIN routine can contain more instructions than are generally allotted by the instruction budget. No extra programming is necessary to facilitate data buffer access because that is handled by the COMTIME interrupt routine discussed below.

FIG. 5 depicts a flow chart of the CND_COMTIME routine 500. This routine is an interrupt routine that is executed upon each occurrence of the horizontal synchronization pulse (sync pulse). At the interrupt signal, routine 500 executes at step 502. At step 504, the status of the computer system is temporarily saved in a local register. The status information typically includes all current register values and the present program counter value associated with each processor.

At step 506, the routine queries whether the top of a video frame has been reached. If this query is affirmatively answered the routine queries, at step 508, whether the SWAP_OUTPUT_BUFFER_FLAG (SOBF) is set. If the SOBF is set, at step 510, the output buffers are swapped, i.e., when the MAIN routine is restarted, it will begin filling a new buffer (second) with data. The DONE_PROCESSING_FLAG (DPF) is reset at step 512. From step 512 or if the top of the frame has not yet been reached (step 506), the routine proceeds to step 514.

At step 514, the input data is processed. This processing distributes input data from the input circuitry amongst the input registers. Thereafter, the input data is clocked from the input registers into an input buffer, e.g., a specified portion of local memory. In some applications, multiple input data buffers may be used. Therefore, if necessary, the input data processing would also include selecting a new input data buffer.

At step 516, the output data is processed. During output data processing, the output data is read from the output buffer that is not being filled with output data. The retrieved data is transferred to the output registers. In this manner, one scanline of video data at a time is accessed from the distributed output buffer and transferred to the output registers. By serially emptying the output registers, a scanline of video information in bit-serial order is sent to the output circuit.

At step 518, the state of the computer system is reset as defined by the previously saved status information (saved at step 504). At step 520, the program counter is set to the count at which the interrupt was serviced. In other words, the MAIN routine is returned to the instruction that was being executed when the interrupt occurred. At step 522, the CND_COMTIME routine ends.

Using this invention, the MAIN routine can be of any length and is written without regard for updating the input and output data buffers. Additionally, since the data buffers are updated independent of the MAIN routine, the size of the input and output buffers are arbitrary. As such, the output buffers can be designed to support a video monitor having any size screen. Since input and output buffer functions are accomplished on an interrupt basis, rather than as a portion of the MAIN routine, the MAIN routine is simplified as compared to the prior art and not constrained by data buffering requirements.

Furthermore, CND_COMTIME routine 500 is depicted and described as accessing both input and output buffers. Alternatively, some applications of the invention may only require the input or output data to be buffered. For those applications, the unnecessary buffer accessing step can be removed from routine 500.

Also, the foregoing disclosure discussed the computer system as having the same number of processors as pixels in a video scanline. However, this illustrative arrangement should not be construed as a limitation on the invention. In fact, if there are less processors than pixels, i.e., at any instant the processors compute only a subset of the total number of pixels in a scanline, then the CND_COMTIME interrupt routine should be executed more often to generate a full scanline of pixel values for the output circuit. For example, if there are 100 pixels in a scanline and only 25 processors computing one fourth of the scanline pixel values, then the CND_COMTIME routine should be execute four times for each horizontal synchronization pulse. In other words, the interrupt signal used to trigger execution of the CND_COMTIME routine occurs four times as often as the horizontal synchronization pulse used by the video monitor. Consequently, the invention can be utilized with any number of processors.

Although various embodiments which incorporate the teachings of the present invention have been shown and described in detail herein, those skilled in the art can readily devise many other varied embodiments that still incorporate these teachings.

What is claimed is:

1. In a parallel processing computer containing a plurality of processors, each connected to a memory unit, apparatus for accessing a distributed data buffer comprising:

a processing unit within each of said processor for executing a first routine;

a portion of each of said memory units forming a portion of said distributed data buffer and used for storing data associated with said execution of said first routine;

means, connected to said processing unit, for interrupting, in response to an interrupt signal, said execution of said first routine on said plurality of processors;

means, within each of said memory units, for storing, in response to said interrupt signal, computer status information;

said processing unit within each of the plurality of processors executes, in response to said interrupt signal, a second routine that accesses the data stored in said portion of said distributed data buffer;

means, connected to said processing unit, for restoring said status of said computer in accordance with said previously stored computer status information; and means, connected to said processing unit, for restarting said execution of said first routine at a position within the first routine at which the first routine was interrupted to execute said second routine.

2. The apparatus of claim 1 wherein said distributed data buffer further comprises an output buffer that temporarily stores output data generated by said processors.

3. The apparatus of claim 2 wherein said distributed data buffer further comprises an input buffer that temporarily stores input data for use by said processors.

4. The apparatus of claim i wherein said distributed data buffer further comprises an output buffer that temporarily stores output data generated by said processors and an input buffer that temporarily stores input data for use by said processors.

5. The apparatus of claim 1 wherein said data is video data and said first routine is a video data processing routine.

6. The apparatus of claim i wherein said computer status information further comprises register values and a program counter value indicating a position in the first routine at which the interrupt signal occurred.

7. The apparatus of claim i wherein said interrupt signal is a horizontal synchronization signal used by a video display monitor to mark a beginning of each scanline within a frame of video information.

8. In a parallel processing computer containing a plurality of processors, each connected to a memory unit, a method for accessing a distributed data buffer comprising the steps of:

executing a first routine within each of said processors;

forming a portion of said distributed data buffer within each of said memory units and using the portion of said distributed data buffer for storing data associated with said execution of said first routine;

interrupting, in response to an interrupt signal, said execution of said first routine;

storing, in response to said interrupt signal, computer status information;

executing, in response to said interrupt signal, a second routine that accesses the data stored in said portion of said distributed data buffer;

restoring said status of said computer in accordance with said previously stored computer status information; and restarting said execution of said first routine at a position within the first routine at which the first routine was interrupted to execute said second routine.

9. The method of claim 8 wherein said distributed data buffer is an output buffer that temporarily stores output data generated by said processors.

10. The method of claim 8 wherein said distributed data buffer is an input buffer that temporarily stores input data for use by said processors.

11. The method of claim 8 wherein said distributed data buffer is an output buffer that temporarily stores output data generated by said processors and an input buffer that temporarily stores input data for use by said processors.

12. The method of claim 8 wherein said data is video data and said first routine is a video data processing routine.

13. The method of claim 8 wherein said computer status information includes register values and a program counter value indicating a position in the first routine at which the interrupt signal occurred.

14. The method of claim 8 wherein said interrupt signal is a horizontal synchronization signal used by a video display monitor to mark a beginning of each scanline within a frame of video information.

* * * * *